United States Patent
Karisalmi (10) Patent No.: US 12,522,980 B2
(45) Date of Patent: Jan. 13, 2026

(54) CELLULOSE COMPOSITION

(71) Applicant: KEMIRA OYJ, Helsinki (FI)

(72) Inventor: Kaisa Karisalmi, Espoo (FI)

(73) Assignee: KEMIRA OYJ, Helsinki (FI)

(*) Notice: Subject to any disclaimer, the term of this patent is extended or adjusted under 35 U.S.C. 154(b) by 619 days.

(21) Appl. No.: 17/261,194

(22) PCT Filed: Jul. 19, 2019

(86) PCT No.: PCT/EP2019/069543
§ 371 (c)(1),
(2) Date: Jan. 19, 2021

(87) PCT Pub. No.: WO2020/016424
PCT Pub. Date: Jan. 23, 2020

(65) Prior Publication Data
US 2021/0269981 A1   Sep. 2, 2021

(30) Foreign Application Priority Data
Jul. 19, 2018  (SE) .................................. 1850925-7

(51) Int. Cl.
  D21H 11/18       (2006.01)
  C08H 8/00         (2010.01)
  (Continued)

(52) U.S. Cl.
  CPC .............. D21H 11/18 (2013.01); C08H 8/00 (2013.01); D21H 17/23 (2013.01); D21H 17/25 (2013.01); D21H 21/18 (2013.01)

(58) Field of Classification Search
  CPC ........ D21H 11/18; D21H 17/23; D21H 17/25; D21H 21/18; C08H 8/00
  See application file for complete search history.

(56) References Cited

U.S. PATENT DOCUMENTS

2014/0073774 A1* 3/2014 Heiskanen ............. D21H 11/18
                                                               536/56
2014/0323714 A1* 10/2014 Sivonen ................... D21C 3/22
                                                               162/26
(Continued)

FOREIGN PATENT DOCUMENTS

WO  2017009042  1/2017
WO  2017067901  4/2017
WO  2017103335  6/2017

OTHER PUBLICATIONS

G. Siqueira, Re-dispersible carrot nanofibers with high mechanical properties and reinforcing capacity for use in composite materials, Dec. 8, 2015, Elsevier, p. 51-53 (Year: 2015).*

Balea et al. "Valorization of corn stalk by the production of cellulose nanofibers to improve recycled paper properties." BioResources. Feb. 22, 2016;11(2):3416-31.

Guimarães et al. "Cellulose microfibrillated suspension of carrots obtained by mechanical defibrillation and their application in edible starch films." Industrial Crops and Products. Oct. 30, 2016;89:285-94.

(Continued)

*Primary Examiner* — Jacob T Minskey
*Assistant Examiner* — Stephen M Russell
(74) *Attorney, Agent, or Firm* — Robin L. Teskin; Baker, Donelson, Bearman, Caldwell & Berkowitz PC (57) ABSTRACT

The present invention relates to a microfibrillated cellulose composition comprising a microfibrillated cellulose originating from agricultural biomass, said microfibrillated cellulose composition comprising: ≥30 wt % cellulose, 1-15 wt % pectin, 8-25 wt % hemicellulose, 0-12 wt %, lignin, 0-15 wt % ash, and 0-8 wt % protein, based on dry solids content of said composition. The present invention further relates to its manufacture, and use in and manufacture of paper and paperboard products.

13 Claims, 3 Drawing Sheets

(51) Int. Cl.
*D21H 17/23* (2006.01)
*D21H 17/25* (2006.01)
*D21H 21/18* (2006.01)

(56) References Cited

U.S. PATENT DOCUMENTS

| | | | | |
|---|---|---|---|---|
| 2016/0145805 | A1* | 5/2016 | Achatz | D21H 21/36 |
| | | | | 162/4 |
| 2016/0289893 | A1* | 10/2016 | Martin | D21C 9/007 |
| 2017/0218567 | A1* | 8/2017 | Kajanto | D21C 3/04 |
| 2017/0360063 | A1 | 12/2017 | Farr et al. | |

OTHER PUBLICATIONS

Hiasa et al. "Prevention of Aggregation of Pectin-Containing Cellulose Nanofibers Prepared from Mandarin Peel." Journal of Fiber Science and Technology. Jan. 12, 2016;72(1):17-26.

Jongaroontaprangsee et al. "Production of nanofibrillated cellulose with superior water redispersibility from lime residues via a chemical-free process." Carbohydrate polymers. Aug. 1, 2018;193:249-58.

Siqueira et al. "Re-dispersible carrot nanofibers with high mechanical properties and reinforcing capacity for use in composite materials." Composites Science and Technology. Feb. 8, 2016;123:49-56.

\* cited by examiner

CELLULOSE COMPOSITION

RELATED APPLICATIONS

This application is a U.S. National Phase application of Int'l Appl. No. PCT/EP2019/069543, filed Jul. 19, 2019, which claims priority to Swedish Appl. No. SE 1850925-7, filed Jul. 19, 2018, each of which are incorporated herein by reference in their entireties.

FIELD OF THE INVENTION

The present invention relates to a microfibrillated cellulose composition, manufacture thereof, and its use in paper making.

BACKGROUND

The use of microfibrillated cellulose in paper making has been known for some time. The biggest challenge of using microfibrillated cellulose (MFC) in industrial applications is to obtain a transportable microfibrillated cellulose material for a subsequent process. Commercialization of microfibrillated cellulose has been struggling as dewatering of MFC is time and energy consuming due to gel-like and hydroscopic properties of MFC in or together with water, and hornification is easily initiated at higher solids contents, which damages the cellulose fibrils. This causes significant decrease in performance, e.g. when used as a paper strength additive.

Known techniques to provide microfibrillated cellulose materials involve dewatering, and drying. As water is difficult to remove from the MFC additives may be added to improve the dewatering properties. However, these known processes, i.e. dewatering, drying, and additive addition to achieve high solids contents, may provide deterioration of the MFC and the properties it may bring in a pulp and paper manufacturing process. Such deteriorated MFC, if used as a paper strength agent, would not give strength to the pulp or paper manufactured. Deterioration may provide hornification when the dewatered, and/or dried MFC is redispersed before or upon addition to a paper making process. Hornification seems also to be favoured when additives are used in the dewatering, and drying processes. Hornification is shown as a distinct change in the viscosity values, i.e. a drop in viscosity, during processing in paper production.

Most of the research and commercialization efforts have been put on wood-based cellulose. However, there is an increasing demand and interest on efficient usage of the world's resources and recently more efforts and research has been put into secondary streams from industry. By finding new ways to provide value-adding products or to provide new value-adding products as such, our resources may be used much more efficiently than commonly used.

SUMMARY OF THE INVENTION

The present invention introduces a new microfibrillated cellulose composition product which has a high solid content and is thus easy to pack, transport, store and handle. When transporting huge amounts of MFC product it is essential to minimize the amount of water in the product. Advantages in shelf life, storage temperature, and needed space, is providable with the present invention. The present MFC contains much of the constituents of the raw material, as processing of the raw material has not extracted and/or washed away too much of the originally ingoing raw material components. Thus, the present invention may use secondary streams from industry, such as agricultural processing industry, to provide the present MFC. As the invention uses a larger amount of the raw material, less waste needed to be disposed is provided, which provides environmental benefits. Also, the present MFC provide a more natural ingredient for paper production. Also, less water and energy is needed for washing steps before fibrillation which are used for production of conventional MFC.

The present invention provides a MFC which may be dewatered and/or dried without deteriorating its end-use properties. The decrease in or prevention of hornification upon redispersion at use in a papermaking process provides a MFC which is better suited as a paper strength agent, as it provides strength to the paper web and/or paper being produced. The present invention thus provides an easily redispersable MFC, which also have good flow properties in its dewatered and/or dried state, i.e. the present MFC is so called free-flowing. By "free-flowing" is herein meant a dry, powder-like state, with freely flowing characteristics, which provides an easy-to-handle and pour product, which is not gel-like. The present MFC is a dry product, which is easily redispersed and prevents hornification, without the need to include hornification-preventing additives.

Handling of a free flowing MFC product compared to sticky or gel-like MFC product is also an important advantage for a user specially in high volume industries. Higher solid content makes it easier to transport and to transfer at a user, such as in a paper mill environment. This may in addition save costs and space in make-down equipment. Further, due to the obtainable higher dry solids content no additives, such as drying additives or hornification-preventing additives, in a drying step is needed, which saves energy costs, additive costs, and allows for simpler processing. Anionicity may further be achieved with or without chemical modification The present invention relates to provision of microfibrillated cellulose originating from other sources than normally used to provide such materials. Normally wood-based sources are used for MFC production. The present invention provides a possibility to achieve higher valorization of agro-industrial biomasses and to use the existing resources more efficiently.

DETAILED DESCRIPTION

The present invention provides a microfibrillated cellulose composition, which include a microfibrillated cellulose originating from agricultural biomass. The present microfibrillated cellulose composition is useful as a strength agent in papermaking.

Hornification is a descriptive term for physical and chemical changes that occur to pulp fibers during drying, principally shrinkage and formation of internal hydrogen bonds. Some of the hornification may cause irreversible effects.

Hornification may occur during production of microfibrillated cellulose (MFC). If hornification would appear during manufacturing, such a material would become difficult to make down, i.e. redisperse or activate, into a dispersion, before addition to a pulp finish of a papermaking process. Hornification effected MFC is thus not desirable to obtain. MFC may be difficult to obtain in high concentrations due to the possible effect of hornification. It is believed that hornification may be a cause for concentrated MFC after rewetting not performing as good as without concentration, due to important performance factors such as strength becoming impaired.

The present inventors have surprisingly found a microfibrillated cellulose composition which is not affected by hornification, or as prone to hornification as known compositions. The microfibrillated cellulose composition according to the invention is easily activated and re-dispersed. This means that it may be easily diluted and dispersed after having been provided in a dry powder-like form, without hornification appearing. Thus, the present invention provides a microfibrillated cellulose composition which may be provided in high concentrations, i.e. high solids content, and may easily be rewetted before addition to pulp, and providing a paper product having sufficient strength.

The present invention is related to further use of crops which may have been processed in different manners. Crops may herein be a plant product that can be grown and harvested extensively for profit or subsistence. Crop may refer either to the harvested parts or to the harvest in a more refined state (husked, shelled, etc.). The crops have been cultivated by agriculture. Herein the definition of agriculture is limited to plants, and plant-like materials. Thus, herein animal products are excluded. Agriculture is to be interpreted as cultivation of plants and fungi for food, fiber, biofuel, medicinal plants and other products used to sustain and enhance life.

The crops may be subjected to different processes such as industrial processes to extract or retrieve desirable parts and components from the crops. Any remaining part of the crops may be referred to a biomass, such as an agricultural biomass. It is to be noted that the crop itself, as unprocessed, may also be referred to as a biomass.

The present crops may be fruits, vegetables, grasses, etc.

The present crops are preferably food, and/or feed, crops. It is to be noted that by food and feed crops is herein meant crops that are used for production of food and feed products, and all part of the crop, i.e. the plants, may be included even if only parts of the plants are used for the food or feed material. Thus, all parts, or some parts, of the crops may be used in the present invention. It is to be noted that crops are not to include trees as such with their wooden trunks and bark, but fruits from trees are to be included in the definition of crops. Thus microfibrillated cellulose originating from wood is excluded from the present definition of cellulose containing biomass.

The present crops may contain cellulose in a varying degree depending on the crop type.

An agricultural biomass have a cellulose content. Thus, the biomass may be considered a cellulose-containing agricultural biomass.

As can be understood from the above, the cellulose containing material of the present invention is preferably originating from agricultural crops, which may have been processed such as agricultural wastes, by-products, or secondary streams of processing steps. It is to be noted that herein the cellulose containing material may be secondary streams or residues from earlier processing steps of agricultural crops.

The cellulose containing agricultural biomass may be in the form of pomaces, clippings, fragmented, crushed or beaten matter.

The cellulose containing agricultural biomass may originate from vegetables, fruits, grasses, buckwheat, members of the Fabaceae family, and any combination thereof. Example may be selected from sugar beet, potato, cassava, sweet potato, parsnip, radish, carrot, ginger, ginseng, onion, and tomato, cranberry, blueberry, apple, pear, and citrus fruits, e.g. orange, lime, lemon, and grapefruit. The peel and pith of fruits may be used. Grass, such as cereal, i.e. any grass cultivated for the edible components of its grain. Grasses may be selected from maize, wheat, oats, rye, barley, sugar cane, and sorghum. Bagasse is the fibrous matter that remains after sugarcane or sorghum stalks are crushed to extract their juice. The cellulose containing agricultural biomass may also be selected from buckwheat; members of the Fabaceae family, e.g. peas, and beans, such as dry beans and/or soy beans.

Preferably the agricultural biomass originates from components selected from the group consisting of sugar beet, potato, sugar cane, carrot, cassava, sweet potato, cereals, such as maize, and any combination thereof.

The cellulose containing agricultural biomass may originate from parenchymal material. The cellulose containing agricultural biomass May originate from annual plants and/or perennial plants, preferably annual plants.

The cellulose containing agricultural biomass may be wastes, residues, or secondary streams from harvesting; the sugar industry, which processes sugar beet and sugar cane; the starch industry, which processes potatoes and maize; or from any other industry which uses agricultural products for its own interest and produces cellulose containing sidestreams or waste. Examples may be selected from:

harvesting and industrial residues from species such as maize, barley, buckwheat, dry bean, sugar cane, sugar beet, and soybean residues, fruit, berry, or vegetable pomaces from species such as cranberry, blueberry, carrot, tomato, apple, citrus fruits, and pith from species such as sugar cane bagasse, citrus fruits or grapefruits.

The cellulose content of the agricultural biomass may be high, i.e. at least 10 wt % cellulose based on dry solids content, preferably at least 20 wt %. For example, the cellulose content may be about 10-80 wt %, such as 10-70 wt %, 20-70 wt %, 20-65 wt %, 30-65 wt %, 30-60 wt %, based on dry solids content of the biomass. A cellulose content of the agricultural biomass of at least 10 wt % cellulose may be considered a cellulose rich biomass.

Microfibrillar cellulose (MFC) may also be called nanofibrillar cellulose (NFC), nanocellulose, nanofibrillated cellulose, cellulose nanofiber, nano-scale fibrillated cellulose, microfibrillated cellulose, or cellulose nanofibrils (CNF). The wordings may be used interchangeably herein. The size of the MFC fibers may vary depending on the specific manufacturing process.

The microfibrillated cellulose material is obtained as cellulose microfibrils or cellulose microfibril bundles. The length of the microfibrils in the microfibrillated material is typically >1 μm, preferably 1-200 μm, even more preferably 10-100 μm, most preferably 10-60 μm. The diameter of individual microfibrils may be in the range of 2-200 nm, preferably 2-100 nm, more preferably 4-70 nm, even more preferably 5-40 nm. Microfibrillated cellulose material may often comprise bundles of 10-50 microfibrils, the diameter of microfibril bundles being normally <1 µm.

The microfibrillated cellulose composition may have a cellulose content of at least 30 wt %, such as 30-99.9 wt % or 30-99 wt %, based on dry solids content of the microfibrillated cellulose composition.

The raw material to provide the microfibrillar cellulose of the composition may be clippings, pomaces, and/or beaten agricultural material, which provides the agricultural biomass.

The present microfibrillated cellulose composition comprises a microfibrillated cellulose originating from agricultural biomass. The microfibrillated cellulose composition may comprise cellulose, pectine, hemicellulose, lining, ash and protein.

The microfibrillated cellulose composition may comprise:
≥30 wt % cellulose, such as 50-99 wt %, 50-69 wt % or 60-90 wt %,
1-15 wt % pectin, such as 1-10 wt %, 1-8 wt %, or 1-5 wt %,
8-25 wt % hemicellulose, such as 8-20 wt %, 8-15 wt %, or 10-20 wt %,
0-12 wt %, lignin, such as 1-12 wt %, 0-10 wt %, 0-8 wt %, or 5-12 wt %,
0-15 wt % ash, such as 1-15 wt %, 0-10 wt %, 0-8 wt %, or 1-10 wt %, and
0-8 wt % protein, such as 1-8 wt %, 0-6 wt %, 0-5 wt %, or 1-6 wt %, based on dry solids content of said composition. The amount of cellulose is at least 30 wt %, and may be in the range of 50-99 wt %, 60-90 wt %, 30-99 wt %, 40-69 wt %, 45-69 wt %, 45-65 wt %, 50-65 wt %, 50-60 wt %, 50-69 wt %, 55-69 wt %, 60-69 wt %, or 55-65 wt %, based on dry solids content of said composition. The amount of hemicellulose is 8-25 wt %, and may be in the range of 8-20 wt % such as 8-18 wt %, 8-15 wt %, 10-18 wt %, 10-20 wt %, 10-wt %, 12-18 wt %, or 14-16 wt %, based on dry solids content of said composition. The amount of pectin is 1-15 wt %, and may be in the range of 1-10 wt %, 1-8 wt %, 1-7 wt % 1-5 wt %, 5-10 wt %, 1-3 wt %, or 1-2 wt %, based on dry solids content of said composition. The amount of lignin is 0-12 wt %, and may be in the range of 1-12 wt %, 0-10 wt %, 5-12 wt %, 1-10 wt %, 5-10 wt %, 0-8 wt %, 5-8 wt %, or 0-5 wt %, based on dry solids content of said composition. The amount of ash is 0-15 wt %, and may be in the range of 1-15 wt %, 0-10 wt %, 1-10 wt %, 5-10 wt %, 0-8 wt %, 5-8 wt %, or 0-5 wt %, based on dry solids content of said composition. The amount of protein is 0-8 wt %, and may be in the range of 1-8 wt %, 0-6 wt %, 1-6 wt %, 0-5 wt %, 2-5 wt %, 0-4 wt %, 2-4 wt %, or 0-3 wt %, based on dry solids content of said composition.

The microfibrillated cellulose composition may comprise 50-69 wt % cellulose, 1-10 wt % pectin, 8-15 wt % hemicellulose, 0-5 wt %, lignin, 0-5 wt % ash, and 0-4 wt % protein, based on dry solids content of said composition.

The microfibrillated cellulose composition may comprise 50-65 wt % or 55-65 wt % cellulose, 1-7 wt % pectin, 8-15 wt % hemicellulose, 0-5 wt %, lignin, 0-5 wt % ash, and 0-3 wt % protein, based on dry solids content of said composition.

The microfibrillated cellulose composition may have a dry solids content of 15-99.9 wt %, such as 20-95 wt %, 25-90 wt %, 30-90 wt %, 30-95 wt %, 50-99 wt %, 55-99 wt %, 50-95 wt % 60-95 wt %, 70-95 wt %, or 80-95 wt %, based on the microfibrillated cellulose composition. The solids content may successfully be raised above 20 wt %, such as at least 23 wt % or 25 wt %, based on the microfibrillated cellulose composition. However, with the present composition also dry solids of considerably higher contents are obtainable, also without additives to decrease hornification. It has been found that the present composition efficiently prevents or reduces hornification so that high solids contents are obtainable. Solids contents such as 50-99 wt % or 55-99 wt % are obtainable and hornification does not seem to affect the composition in any noticeable degree. The handling of an MFC product having a solids content of 50-99 wt % is easier due to less stickiness, and such high content MFCs are free-flowing materials and can be made down by simple make-down units.

The microfibrillated cellulose composition may have a specific range of the net charge density, Brookfield viscosity, or turbidity value, or it may have a combination of two of said features, or all three.

The microfibrillated cellulose composition may have a net charge density of (−0.01)-(−0.99) meq/g, at pH 7.5, such as (−0.01)-(−0.99) meq/g, (−0.01)-(−0.5) meq/g, (−0.02)-(−0.4) meq/g, (−0.04)-(−0.3) meq/g, (−0.06)-(−0.2) meq/g, (−0.1)-(−0.99) meq/g, (−0.1)-(−0.8) meq/g, (−0.15)-(−0.8) meq/g, at pH 7.5. The charge densities may be measured for example by charge titration using Mütek PCD.

The microfibrillated cellulose composition may have a Brookfield viscosity of at least 80 cP, measured at a concentration of 1.0 wt % at 100 rpm shear rate, such as at least 100 cP. It may be that the viscosity can be about 80-1400 cP, 90-1200 cP, 100-1000 cP, 100-500 cP, 150-1000 cP, 200-1000 cP, or 200-900 cP, measured at a concentration of 1.0 wt % at 100 rpm shear rate. The Brookfield viscosity is measured using a Brookfield DV-II viscosimeter equipped with a vane geometry Pro LV (usually V-72, V-73, V-74 or V-75).

The microfibrillated cellulose composition may have a turbidity value less than 500 NTU, measured at 0.1 wt % concentration, such as less than 400 NTU. The turbidity may be in a range of 100-400 NTU, 200-400 NTU, or 250-350 NTU, measured at 0.1 wt % concentration. The turbidity value may be measured with a HACH 2100AN turbidimeter.

The microfibrillated cellulose composition may have a net charge density of (−0.06)-(−0.99) meq/g, at pH 7.5, using Mütek PCD, and a Brookfield viscosity of preferably 90-1200 cP, measured at a concentration of 1.0 wt % at 100 rpm shear rate, measured using a Brookfield DV-II viscosimeter equipped with a vane geometry ProLV, and optionally a turbidity value of 100-400 NTU, measured at 0.1 wt % concentration, using a HACH 2100AN turbidimeter; preferably a net charge density of (−0.1)-(−0.8) meq/g, at pH 7.5, using Mütek PCD, and a Brookfield viscosity of preferably 100-1000 cP, measured at a concentration of 1.0 wt % at 100 rpm shear rate, measured using a Brookfield DV-II viscosimeter equipped with a vane geometry ProLV, and optionally a turbidity value of 100-400 NTU, measured at 0.1 wt % concentration, using a HACH 2100AN turbidimeter.

The present microfibrillated cellulose composition may not contain any added hornification preventing additives, such as long hydrocarbons, e.g. fatty alcohols, and/or fatty acids, wherein the fatty alcohols may be polyols. Examples of such long hydrocarbons are e.g. tall oil, linseed oil, castor oil, olive oil, palm oil, peanut oil, soybean oil, sesame oil, glycerol, and any combination thereof. Hornification preventing additives go between the fibers of the microfibrillated cellulose composition and pulp furnish, and stick thereto, and physically prevent formation of hydrogen bonds which cause hornification. The present microfibrillated cellulose composition may not contain any hornification preventing additives at all. The present microfibrillated cellulose composition preferably do not contain additives added in the process to provide said microfibrillated cellulose composition. Any additives such as biocides which may have been added to the growing agricultural crop, or any additives added in a prior process to provide said agricultural biomass, if it is e.g. a byproduct or secondary stream of another process, such additives are not to be interpreted or included as added additives in the present microfibrillated cellulose composition, or its manufacture. The microfibrillated cellulose composition may only comprises said biomass originating from agricultural materials as dry solids, and the composition may further comprise water. The microfibrillated cellulose composition may only consists of dry solids from said biomass originating from agricultural materials and water.

The present microfibrillated cellulose composition may be obtained by a method of manufacturing, comprising the steps of:
  providing a agricultural biomass originating from agricultural biomass, said biomass may comprise at least 10 wt % of cellulose, based on dry solids content of said biomass;
  optionally providing water to said biomass;
  optionally subjecting said biomass to pretreatment, e.g. by chemical and/or mechanical means;
  subjecting said biomass to refining to provide fibrillation, and provide a microfibrillated cellulose;
  optionally dewatering the obtained microfibrillated cellulose composition to obtain a dewatered microfibrillated cellulose composition.
  optionally drying the dewatered microfibrillated cellulose composition.

The word "fibrillation" refers to a process. Refining can be defined as subjecting a fiber containing composition (e.g. aqueous), such as a cellulose containing biomass, to shearing and compression forces. One of the things that happens during refining of fibers is fibrillation, the partial delamination of the cell wall, resulting in a microscopically hairy appearance of the wetted fiber surfaces. The "hairs" are also called fibrils. During refining the cellulose containing fiber containing composition is subjected to mechanical forces causing fibrillation, milling, dispersing and/or de-agglomeration effects.

The present manufacturing method may provide the refining by using a continuous, a semi-continuous, and/or a batch refining unit. The refining unit may be selected from the group consisting of a beater; a refiner such as a conical refiner or a disk refiner; a mill; a rotor-rotor mixer; a rotor-stator mixer; and any combination thereof. Beaters and conical refiners may be found as batch refiners, and continuous disk refiner is a continuous refiner.

The fibrillation of the refining step may as disclosed be performed using a mechanical treatment step. Such a treatment step may also be referred to as homogenisation.

The refining may be preceded by pretreatment steps of chemical and/or mechanical nature, which may be selected from the group consisting of oxidation, extraction, washing, and any combination thereof. The present process may contain a pretreatment extraction to provide said agricultural biomass. The extraction may be using an acid or base, or an oxidizing extraction agent such as peracetic acid, to provide the extraction of the biomass then used in the further steps of the present process. Acids and bases that may be used for this purpose may be selected from hydrochloric acid, sulphuric acid, sodium hydroxide, potassium hydroxide, or any other organic or inorganic material. If a pretreatment is used it is to be noted that as little as possible of the biomass components or its degradation products from any pretreatment are to be removed from said biomass. Preferably, no additional chemical additives are provided to the MFC composition apart from the ones used during the pretreatment step, e.g. extraction.

The refining may be performed at a cellulose content of at least 30 wt %, such as 30-99 wt %, 50-99 wt %, or 60-90 wt %, based on dry solids content of the microfibrillated cellulose composition.

The refining may be performed at a solid content of at least 10 wt %, such as at least 15 wt %, at least 30 wt %, at least 40 wt % or at least 50 wt %. Refining may be performed at a solids content of 10-99 wt %, such as 15-99 wt %, 15-30 wt %, 10-40 wt %, 10%-50 wt %, 30-99 wt %, 40-90 wt %, or 50-85 wt %, based on dry solids content of the microfibrillated cellulose composition.

The refining may be performed under temperature control. The temperature during the refining may be at least 40° C. or at least 50° C., such as 40-80° C., 50-80° C., or 55-70° C.

The refined material may after refining be further processed e.g. dried to a desired solids content, which is higher than in the refiner. Solids contents of up to 99 wt % is obtainable. Any conventional dryer is applicable for this application. If the microfibrillated cellulose composition has passed the refining step and only has been dewatered thereafter, it may have a solids content of about 11-99 wt % based on dry solids content of the microfibrillated cellulose composition; such as 11-50 wt % wt %, 15-45 wt %, 20-40 wt %, or 25-35 wt %. If the microfibrillated cellulose composition has passed the refining step and been both dewatered and dried, it may have a solids content of about 30-99.9 wt % based on dry solids content of the microfibrillated cellulose composition; such as 30-99 wt %, 35-99 wt %, 40-90 wt %, 40-85 wt %, 45-80 wt %, 50-75 wt %, or 50-99 wt %.

Before its used as a component in a strength additive system, the concentrated or dried microfibrillated cellulose can be redispersed into water, to suitable use concentration, for example 0.2-5 wt %, preferably 0.3-4 wt %, more preferably 0.5-3 wt %.

Herein is also provided a strength additive system for use in manufacturing of paper products comprising the present microfibrillated cellulose composition, and at least one cationic additive. The cationic additive may be natural or synthetic polymers, or a mixture thereof.

The strength additive system may comprise a plurality of natural and/or synthetic polymers. The choice between natural polymer and synthetic polymer depends on a number of factors, such as their effectiveness, economical aspects, the effect on machine runnability and productivity, ease of use, product availability and shelf life. Because the present strength additive system can use both synthetic polymer or natural polymers, or their mixtures, the degrees of freedom in selection of the polymer component are unexpectedly increased.

In the context of the present application it is understood that a cationic polymer may also contain local anionic charges as long as its net charge of the polymer is cationic.

The at least one cationic additive may be selected from the group consisting of polyvinylamine (PVAM), polyethylene imine (PEI), homopolymer or copolymer of diallyldimethylammonium chloride (DADMAC), polyamine, cationic polyacrylamide (C-PAM), amphoteric polyacrylamide, glyoxalated polyacrylamide (G-PAM), polyacrylic amide (PAAE), polyethylene oxide (PEO), natural polymers such as cationic starch, chitin, guargum, and any combination thereof. The cationic additive is preferably a polymeric compound. The cationic additive may preferably be selected from natural polymers.

For use in strength agent system the starch may be cationised by any suitable method. Preferably starch is cationised by using 2,3-epoxypropyltrimethylammonium chloride or 3-chloro-2-hydroxypropyltrimethylammonium chloride, 2,3-epoxypropyltrimethylammonium chloride being preferred. It is also possible to cationised starch by using cationic acrylamide derivatives, such as (3-acrylamidopropyl)-trimethylammonium chloride. The degree of substitution (DS) indicates the number of cationic groups in the starch on average per glucose unit. Preferably the natural polymer is cationic starch with a substitution degree in the range of 0.01-0.3, preferably 0.02-0.1, more preferably 0.03-0.6.

According to one embodiment the cationic starch is non-degraded, which means that the starch has been modified solely by cationisation, and its backbone is nondegraded and non-cross-linked.

According to one embodiment the cationic starch may be any suitable cationic starch used in paper making, such as potato, rice, corn, waxy corn, wheat, barley or tapioca starch, preferably corn starch or potato starch. Typically the amylopectin content of the cationic starch is in the range of 65-90%, preferably 70-85%.

According to one embodiment at least 70 wt % of the starch units of the cationic starch have an average molecular weight (MW) over 20 000 000 g/mol, preferably 50 000 000 g/mol, more preferably 100 000 000 g/mol.

The at least one cationic additive in the strength additive system may in addition to or alternatively to natural polymers, such as starch, comprise a synthetic polymer selected from the group cationic polyacrylamide (C-PAM), glyoxalated polyacrylamide (G-PAM), amphoteric polyacrylamide, polydiallyldimethylammonium chloride (poly-DADMAC), polyacrylic amide (PAAE), polyvinyl amine (PVAm), polyethylene oxide (PEO), polyethyleneimine (PEI), and any combination thereof.

The amphoteric polyacrylamide is cationic when the net charge is cationic.

The average molecular weight of the synthetic polymer may be in the range 100 000-20 000 000 g/mol, typically 300 000-8 000 000 g/mol, more typically 300 000-1 500 000 g/mol. The molecular weight of the polymer is preferably high enough to ensure efficient adsorption and hydrogen bonding between the different components, but not so high that the polymer would cause flocculation in the system.

Especially the synthetic polymer which may be used as the at least one cationic additive may be a copolymer of methacrylamide or acrylamide and at least one cationic monomer. The cationic monomer may be selected from a group consisting of methacryloyloxyethyltrimethyl ammonium chloride, acryloyloxyethyltrimethyl ammonium chloride, 3-(methacrylamido) propyltrimethyl ammonium chloride, 3-(acryloylamido) 10 propyltrimethyl ammonium chloride, diallyldimethyl ammonium chloride, dimethylaminoethyl acrylate, dimethylaminoethyl methacrylate, dimethylaminopropylacrylamide and dimethylaminopropylmethacrylamide.

Herein, the value "average molecular weight" is used to describe the magnitude of the polymer chain length. Average molecular weight values are calculated from intrinsic viscosity results measured in a known manner in 1N NaCl at 25° C. The capillary selected is appropriate for the viscosity value to be measured, and in the measurements of this application an Ubbelohde capillary viscometer with constant K=0.005228 was used. The average molecular weight is then calculated from intrinsic viscosity result in a known manner using Mark-Houwink equation $[D]=K \cdot M^a$, where [D] is intrinsic viscosity, M molecular weight (g/mol), and K and a are parameters given in Polymer Handbook, Fourth Edition, Volume 2, Editors: J. Brandrup, E. H. Immergut and E. A. Grulke, John Wiley 8 Sons, Inc., USA, 1999. In the case the molecular weight, as determined by intrinsic viscosity, was less than 1 000 000, a GPH 25 HPCL-SEC analysis with PEO reference polymer calibration was used.

The strength additive system may comprise at least 50 wt %, preferably at least 60 wt %, more preferably at least 70 wt %, even more preferably at least 80 wt %, of microfibrillated cellulose composition, calculated from the dry solids content of the system. According to one preferable embodiment the strength additive system may comprise 50-99.9 wt %, preferably 70-99.9 wt %, more preferably 80-99.5 wt %, even more preferably 85-90 wt %, of microfibrillated cellulose composition, calculated from the dry solids content. According to one embodiment the strength additive system may comprise 50-90 wt %, preferably 60-90 wt %, of microfibrillated cellulose composition, calculated from the dry solids content.

The present microfibrillated cellulose composition may be included in a stock of fibers. The stock of fibers may be used in the manufacture of paper and paperboard products.

According to one embodiment of the invention at least one cationic additive and the microfibrillated cellulose composition of the strength additive system can be added simultaneously or sequentially, in either order, to the pulp furnish, either to the thin or thick stock. It may be preferable to add the at least one cationic additive before the microfibrillated cellulose composition to the pulp furnish. They can be added simultaneously but separately. Alternatively, if added sequentially, the microfibrillated cellulose composition may be added to the thin stock and the at least one cationic additive may be added to the thick stock, or the other way around. However, preferably they are added to the thick stock simultaneously or one after the other.

The present microfibrillated cellulose composition may be used in the manufacturing of a paper or paperboard product. Herein is also included a paper or paperboard product comprising present microfibrillated cellulose composition. The present paper or board product may be selected from fine papers, printing papers, towels, tissues and packaging materials, such as a food packaging materials.

Paper manufacturing may be divided into several sections. Pulp is provided. The pulp may be refined and/or may be mixed in water, e.g. with other additives, to make a pulp furnish. The pulp furnish may be provided as a wet web, water is drained from the web, the wet paper sheet may go through presses and dries, and finally rolled into large rolls.

"Pulp" refers typically to a fibrous cellulosic material. The pulp may also refer to cellulosic fibers, non-cellulosic polymeric fibers, or any combinations thereof. Suitable cellulosic fibers for the production of the pulps are all conventional grades, for example mechanical pulp, bleached and unbleached chemical pulp, recycled pulp, and paper stocks obtained from all annuals. Mechanical pulp includes, for example, groundwood, thermomechanical pulp (TMP), chemo thermochemical pulp (CTMP), alkaline peroxide mechanical pulp (APMP), groundwood pulp produced by pressurized grinding, semi-chemical pulp, high-yield chemical pulp and refiner mechanical pulp (RMP). Examples of suitable chemical pulps are sulfate, sulfite, and soda pulps. The unbleached chemical pulps, which are also referred to as unbleached kraft pulp, can be particularly used. In addition to cellulosic fibers, or instead of them, the pulp may comprise non-cellulosic polymeric fibers, such as fibers of polyethylene, polypropylene, or polyester, in the form of e.g. single component or bicomponent fibers.

"Pulp furnish" refers to a mixture of pulp and water. The pulp furnish may also be referred to as pulp slurry herein. The pulp furnish is prepared in practice using water, which can be partially or completely recycled from the paper machine. It can be either treated or untreated white water or a mixture of such water qualities. The pulp furnish may contain interfering substances, such as fillers. The filler content of paper may be up to about 40% by weight. Suitable fillers are, for example, clay, kaolin, natural and precipitated chalk, titanium dioxide, talc, calcium sulfate, barium sulfate, alumina, satin white or mixtures of the stated fillers. The aqueous pulp furnish may comprise recycled and/or virgin fibers.

Herein is provided a method of making a paper product comprising:
providing an aqueous pulp furnish, draining the aqueous pulp furnish to form a wet fiber web, and drying the wet fiber web to obtain the paper product; and
further comprising addition of the present microfibrillated cellulose composition to the aqueous pulp furnish or on the wet web.

The microfibrillated cellulose composition may be added to the aqueous pulp furnish selected from the thin stock, thick stock, or both thin stock and thick stock. Addition to thin stock or to thick stock is preferred.

Optionally at least one cationic additive may be added to the aqueous pulp furnish or on the wet web, simultaneously or subsequent of said microfibrillated cellulose composition. Thus, if cationic additive is included, herein is also provided a method of making a paper product comprising:
providing an aqueous pulp furnish, draining the aqueous pulp furnish to form a wet fiber web, and drying the wet fiber web to obtain the paper or paperboard product; and
further comprising addition of the present strength additive to the aqueous pulp furnish or on the wet web.

The cationic additive, preferably a cationic polymer which may be natural or synthetic, may be added to the aqueous pulp furnish in an amount of about 0.01-20 kg additive/ton pulp furnish, such as 0.1-20 kg/ton, 0.5-20 kg/ton, 0.5-10 kg/ton, 1-20 kg/ton, 2-15 kg/ton, 3-10 kg/ton, 0.5-2 kg/ton, 1-2 kg/ton, or 10-20 kg/ton, based on dry solids content per ton of dry solids of pulp furnish.

The microfibrillated cellulose composition may be added to the aqueous pulp furnish in an amount of about 1-100 kg microfibrillated cellulose composition/ton pulp furnish, such as 1-70 kg/ton, 1-50 kg/ton, 3-50 kg/ton, 4-40 kg/ton, 4.5-40 kg/ton, 5-40 kg/ton, 5-70 kg/ton, 6-36 kg/ton, 8-34 kg/ton, 10-50 kg/ton, 10-32 kg/ton, 10-30 kg/ton, or 15-50 kg/ton, based on dry solids content microfibrillated cellulose composition per ton of dry solids of pulp furnish.

The microfibrillated additive and cationic additive may be added to the aqueous pulp furnish in amounts of 1-100 kg microfibrillated cellulose composition/ton pulp furnish, and 0.01-20 kg cationic additive/ton pulp furnish; such as 1-70 kg microfibrillated cellulose composition/ton pulp furnish, and 0.5-20 kg cationic additive/ton pulp furnish; or 1-50 kg microfibrillated cellulose composition/ton pulp furnish, and 1-20 kg cationic additive/ton pulp furnish.

The strength additive system according to the invention may be used together with any suitable retention program or system at a paper or paperboard machine.

According to one embodiment of the invention a cationic retention polymer is added to the pulp furnish after the addition of the strength additive system. Preferably the cationic retention polymer is added just before the drainage. The cationic retention polymer may be cationic polyacrylamide having an average molecular weight of 4 000 000-18 000 000 Da, preferably 4 000 000-12000000 Da, more preferably 7 000 000-10 000 000 Da, and/or has a charge density of 0.2-2.5 meq/g, preferably 0.5-1.5 meq/g, more preferably 0.7-1.2 meq/g. The stock comprising cellulose fibres may be obtained by using furnish from kraft pulping, chemithermomechanical (CTM) pulping or by repulping recycled fibres.

The pulp furnish may further be provided with retention chemicals such as silica microparticles, e.g. silica sols. Silica may be used to increase retention.

The silica sol may be added to the aqueous pulp furnish in an amount of about 100-600 g/ton silica sol/ton pulp furnish, such as about 200-600 g/ton, 250-550 g/ton or 300-500 g/ton, based on dry solids content per ton of dry solids of pulp furnish.

A paper or paperboard product comprising the present microfibrillated cellulose composition, or the present strength additive system may be a paper product being selected from the group consisting of fine papers, printing papers, towels, tissues, and packaging materials. Tissue is herein included into paper product.

According to one embodiment of the invention the paper or board product wherein at least one of the layers of said product comprises microfibrillated cellulose composition originating from non-wood sources.

The present microfibrillated cellulose composition may be used as a strength additive in the manufacture of paper or paperboard products.

EXAMPLES

Analytical Methods:
1.1 Sugar Composition Analysis

Sugar analysis was done based on analytical procedure of National Renewable Energy Laboratory for determination of Structural Carbohydrates and Lignin in Biomass (https://www.nrel.gov/docs/gen/fy13/42618.pdf). Analyzed contents were carbohydrates, lining and uronic acids.

1.2 Kjeldahl Nitrogen Based Protein Analysis

The protein content in the samples was analyzed through measurement of the total nitrogen content in the samples. The nitrogen content was converted to protein content by multiplying the value with a conversion factor of 6.25. The nitrogen content is analyzed with Kjeldahl method with FOSS Kjeltec 8460+Compass software. The sample is first digested by heating in 12 ml of strong sulfuric acid (95-97%, Merck) in the presence of 2 Kjeltabs Cu-3.5 and 40 mg of Devarda's alloy (Merck, catalogue #105341).

In the equipment the nitrogen in the form of ammonium salts from the digested sample is distilled after release by addition of NaOH solution and the content of ammonia condensing in the receiving solution is titrated.

The analysis is non-specific analysis of nitrogen, and therefore, gives the upper limit for the protein content, but proteins are the main source of the nitrogen content in the samples. The detection limit of the method is 0.1 mg of nitrogen in the sample.

1.3 Oven Drying

Inorganics and ash residues were measured based on standards SCAN-C 3:78, SCAN-C 6:62, respectively.

1.4 Turbidity

Turbidity value (NTU) is referring to dispersability and/or solubility of a substance into the chosen solvent. It is corresponding to particle size of the measured substances in relative matter in the chosen solvent. Smaller value indicates smaller particle size or particle surface area and lower concentration.

For turbidity measurement a 1 wt % sample was prepared according to the standard laboratory protocol. For turbidity measurement the pH of the 1% sample was adjusted to 8-9 with either NaOH or HCl. The turbidity value was measured with a HACH 2100AN turbidimeter according to the equipment specific instruction manual.

1.5 Viscosity

Viscosity value (mPa, cp) is referring to viscoelastic property of a substance and/or substances in the chosen solvent. It is dependent on different parameters such as structure, chemical composition, molecular weight of substances and the measuring temperature.

For viscosity measurement a 1 wt % sample was prepared according to the standard laboratory protocol. The pH of the 1 wt % sample was adjusted to 8-9 with either NaOH or HCl. Viscosity was measured with 50 rpm and 100 rpm at 25° C. using a spindel with vane geometry (Brookfield V-72, V-73 or V-75). The Brookfield viscosity was measured using a Brookfield DV-II viscosimeter according to the equipment specific instruction manual.

1.6 Charge Density

Charge density is referring to quantitative amount of charges (negative or positive) on the fibre surface. The potential value of the substances in water is recorded and the charge density is calculated based on the potential. The measurements have been performed according to SCAN-W 12:04 (2004).

Example 1: Activation and Re-Dispersion of the Dried Microfibrillated Cellulose (MFC) Composition A sugarbeet originated MFC compositions was used in the experiments.

The compositions were obtained by extracting using alkali, dewatering and mechanically fibrillating sugarbeet clippings which were obtained from a sidestream of sugar production. No additional chemical additives were added to the MFC apart from the ones used during the pretreatment extraction.

The thus obtained MFC composition had a solid content of 29.8 wt % (MFC1). The obtained MFC composition was further dried to two different solid contents (MFC2 and MFC 3).

The solid contents were measured of each sample. The samples were weighted and put into a laboratory oven over night (16 hours), at the temperature of 105° C. The samples were allowed to cool down in dessicator for 1 hour and then weighted again. The solid content of each sample was calculated $$\frac{(m_{L+N,2} - M_L) \times 100}{N,1} = \% \text{ solid content}$$

$_{N,1}$=weight of sample before drying (g)

$m_{L+N,2}$=sum of the weight of container and sample after drying (g)

$m_L$=weight of container (g)

The solid contents are summarized in table 2.

TABLE 1

| Analytical method | Analyzed substance/property | Used protocol/standard |
|---|---|---|
| UV, ionic chromatography | sugar content (cellulose, hemicellulose, lignin, pectin) | https://www.nrel.gov/docs/gen/fy13/42618.pdf |
| Oven drying | inorganics, ash residue | oven SCAN-C 3:78<br>ash SCAN-C 6:62 |
| Kjeldahl nitrogen | Protein | Internal protocol, based on the manual of the equipment |
| Brookfield viscometer | Viscosity, rehological properties, size, fibrillation stage | Internal protocol, based on the manual of the equipment |
| Turbimeter | turbidity, size | Internal protocol, based on the manual of the equipment |
| Charge density titration | charge | SCAN-W 12:04(2004) |
| Dynamic sheet former | Performance in application (board) | Internal protocol based on the equipment manual |
| End-product (board) measurements | tensile strength, Z-strength, Scott bond etc. | Tensile SO 1924-3<br>Scott Bond TAPPI T569<br>Thickness, Bulk, Density ISO 534<br>Air permeability ISO 5636-3<br>Grammage ISO 536<br>Z-strength ISO 15754:2009<br>Ash of paper TAPPI T211 om-93 |

TABLE 2

Measured solid contents of dewatered and air-dried MFC samples and reference MFC (not dried, only dewatered)

| Sample | Measured solid content |
| --- | --- |
| MFC1 (ref) | 29.8 wt % |
| MFC2 | 53.3 wt % |
| MFC3 | 99.9 wt % |

The MFC samples were diluted with water to 1 weight-% (wt %) concentration. MFC1 sample was allowed to wet with magnetic stirring for 30 minutes and MFC2 and MFC3 samples were allowed to wet over night with magnetic stirring. The final activation and re-dispersion was performed with Ultraturrax high shear mixer (3×10 seconds).

Viscosity, turbidity and charge were measured after the re-dispersion.

The charge densities were measured by charge titration using Mütek PCD, the viscosity was measured using a Brookfield DV-II viscosimeter equipped with a vane geometry Pro LV, and turbidity was measured using a HACH 2100AN turbidimeter.

All viscosity values are given as centipoise (cp). The results are summarized in table 3.

TABLE 3

Analytical results of MFC1, MFC2 and MFC3

| Sample | Solid content (wt %) | Turbidity (NTU) | Viscocity rpm 50 (spindel 73) (cP) | Viscocity rpm 100 (spindel 73) (cP) | Viscocity drop average % | Charge meq/g pH 4 | Charge meq/g pH 7.5 |
| --- | --- | --- | --- | --- | --- | --- | --- |
| MFC1 | 29.8 | 382 | 260 | 153 | 0 | −0.04 | −0.09 |
| MFC2 | 53.3 | 423 | 220 | 133 | 14 | −0.03 | −0.08 |
| MFC3 | 99.9 | 372 | 161 | 103 | 45 | −0.05 | −0.10 |

It can be seen from table 3 that viscosity drops as a function of increasing solid content. Drying doesn't seem to affect the charge. Both viscosity drops of MFC, which has been dried, and MFC 3, which have been dried for a longer time period, are considered acceptable.

Example 2: Chemical Analysis of Dried MFC Composition

The chemical composition of all samples MFC1 to MFC3 was determined (wt % of the composition):
- content of inorganic material (%) was determined via ashing the sample and weighting the residual based on the Tappi Test Methods T 211
- protein w-% was determined using the Kjeldahl nitrogen method and Kjeltec 8400 analyzer
- carbohydrate content, lignin and uronic acids content were determined using UV spectroscopy apparatus (HP 8452A, Ultraviolet-Visible), gravimetric determination and ion chromatography (Dionex ICS-3000 system) after acid hydrolysis of the sample
- determination of structural carbohydrates and lining in biomass, according to Laboratory Analytical Procedure from National Renewable Energy Laboratory (NREL), of April 2008, revised August 2012, by A. Sluiter et. al, (https://www.nrel.gov/docs/gen/fy13/42618.pdf)

TABLE 4

Chemical composition of the MFC composition samples (measurements done from MFC1 sample)

| Sample | Glucan % | Xylan % | Arabinan % | Galactan % | Mannan % | Uronicacids % | Lignin (Klason + ASL) % | Ash % | Protein % |
| --- | --- | --- | --- | --- | --- | --- | --- | --- | --- |
| MFC1 | 63.5 | 3.6 | 4.2 | 1.7 | 2.1 | 1.1 | 10.4 | 6.6 | 2.5 |

The Glucan originates mainly from cellulose, but a small amount may also originate from hemicellulose. Xylan, Arabinan, Galactan & Mannan describe the hemicellulose content. Uronicacids describe the pectin content.

Example 3: Dynamic Hand Sheet Test with Dried MFC Samples

Laboratory sheets were made of CTMP furnish and the furnish was disintegrated with Lorenz&Wettre disintegrator following the protocol ISO 5263. Lab sheets were prepared with dynamic sheet former (Tecpap). The addition order of the chemicals to the pulp (pulp consistency 0.5%) was as follows (stirring 400 rpm):
1. MFC (at 0 seconds)
2. Fennopol K3400 (cationic polyacrylamide) (at 10 seconds)
3. Fennosil 2180 (silica) (at 20 seconds)
4. Sheet forming (at 30 seconds)

The sheets were allowed to stay in a constant temperature and humidity room (T=22° C., humidity=50%) for 1 day before the measurements. The sheet properties, such as tensile index, Z-strength and Scott bond were measured both in CD and MD according to appropriate ISO-standards.

TABLE 5

MFC addition in different tests points

| | | Fennopol (kg/ton) | Silica (kg/ton) | MFC |
|---|---|---|---|---|
| Test point 1 | Pure CTMP/Zero sample | 0.2 | 2 | 0 |
| Test point 2 | MFC1 | 0.2 | 2 | MFC1, 30 kg/ton |
| Test point 3 | MFC2 | 0.2 | 2 | MFC2, 30 kg/ton |
| Test point 4 | MFC3 | 0.2 | 2 | MFC3, 30 kg/ton |

Retention chemicals: Fennopol K3400 (cationic polyacrylamide) of 0.2 kg/ton, amount calculated as dry compound. Silica (Fennosil 2180) of 2 kg/ton, amount calculated as product which has a solids content of 7.4 wt %.

Figure 1:
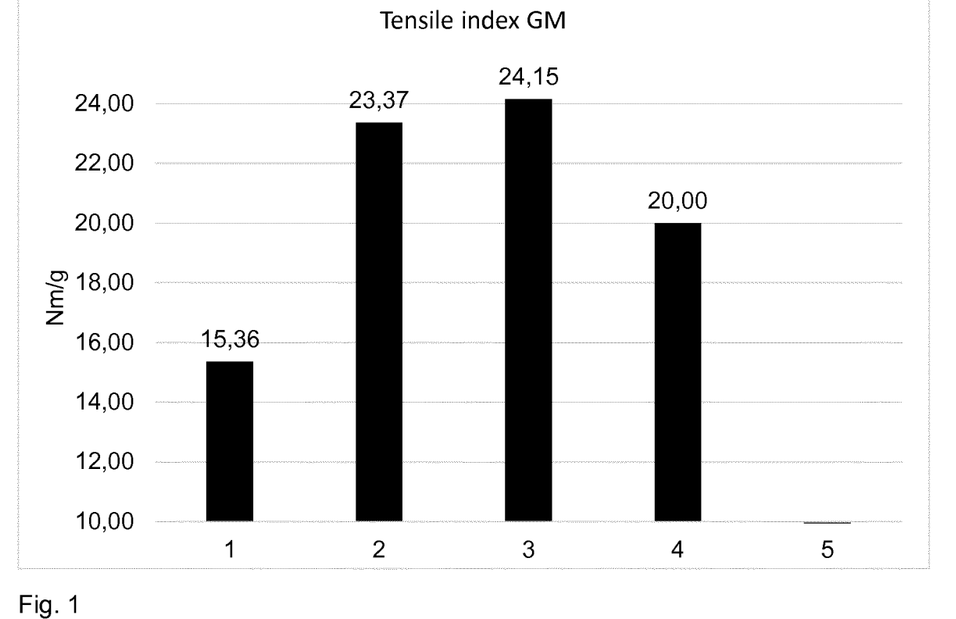
FIG. 1 discloses the tensile index of performed tests according to Example 3.
Figure 2:
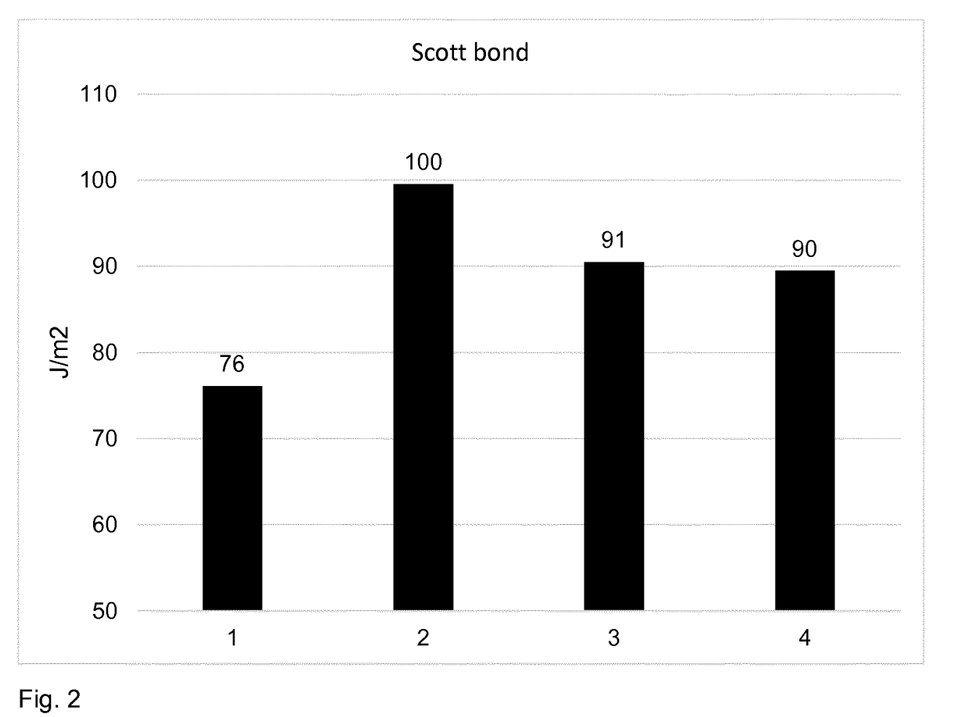
FIG. 2 discloses the Scott bond strength of performed tests according to Example 3.
Figure 3:
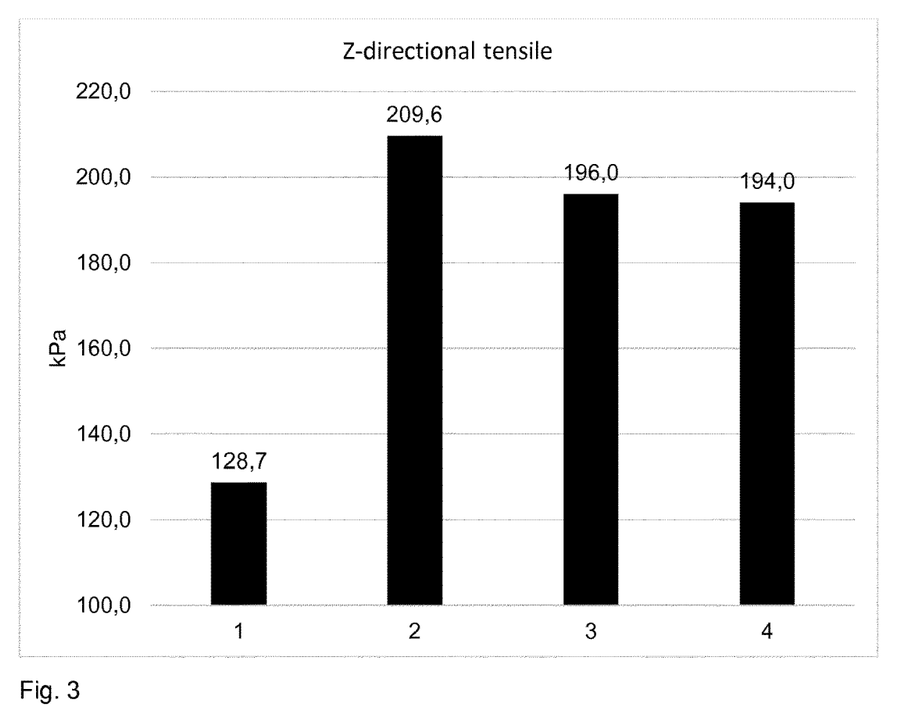
FIG. 3 discloses the Z-directional tensile strength of performed tests according to Example 3.

It can be seen from the results shown in FIGS. 1-3 that the drying has a slight effect on strength performance. However, the drop is surprisingly little, only around 10%. MFC2 and MFC3 give still a significant improvement to the selected end-product strength properties.

Example 4: Dynamic Hand Sheet Test with Dried MFC Samples and Starch

The sheets were made of CTMP furnish and the furnish was disintegrated with Lorenz&Wettre disintegrator following the protocol ISO 5263.

Lab sheets were prepared with dynamic sheet former (Tecpap). The addition order of the chemicals to the pulp (pulp consistency 0.5%) as follows (stirring 400 rpm):
1. Starch at 0 seconds
2. MFC at 30 seconds
3. Fennopol K3400 at 40 seconds
4. Fennosil 2180 at 50 seconds
5. Sheet forming at 60 seconds The sheets were allowed to stay in a constant temperature and humidity room (T=22° C., humidity=50%) for 1 day before the measurements. The sheet properties, such as tensile index, Z-strength and Scott bond were measured both in CD and MD according to appropriate ISO-standards.

TABLE 6

| | | Fennopol (kg/ton) | Silica (kg/ton) | Starch (kg/ton) | MFC |
|---|---|---|---|---|---|
| Test point 1 | Pure CTMP/Zero sample | 0.2 | 2 | | 0 |
| Test point 2 | | 0.2 | 2 | 10 | 0 |
| Test point 3 | MFC1, 30 kg/ton | 0.2 | 2 | 10 | MFC1, 30 kg/ton |
| Test point 4 | MFC2, 30 kg/ton | 0.2 | 2 | 10 | MFC2, 30 kg/ton |
| Test point 5 | MFC3, 30 kg/ton | 0.2 | 2 | 10 | MFC3, 30 kg/ton |

Cationic additive of strength additive system: Cationic starch of 10 kg/ton, amount calculated as dry compound.

Retention chemicals: Fennopol K3400 (cationic polyacrylamide) of 0.2 kg/ton, amount calculated as dry compound.

Silica (Fennosil 2180) of 2 kg/ton, amount calculated as product which has a solids content of 7.4 wt %.

Figure 4:
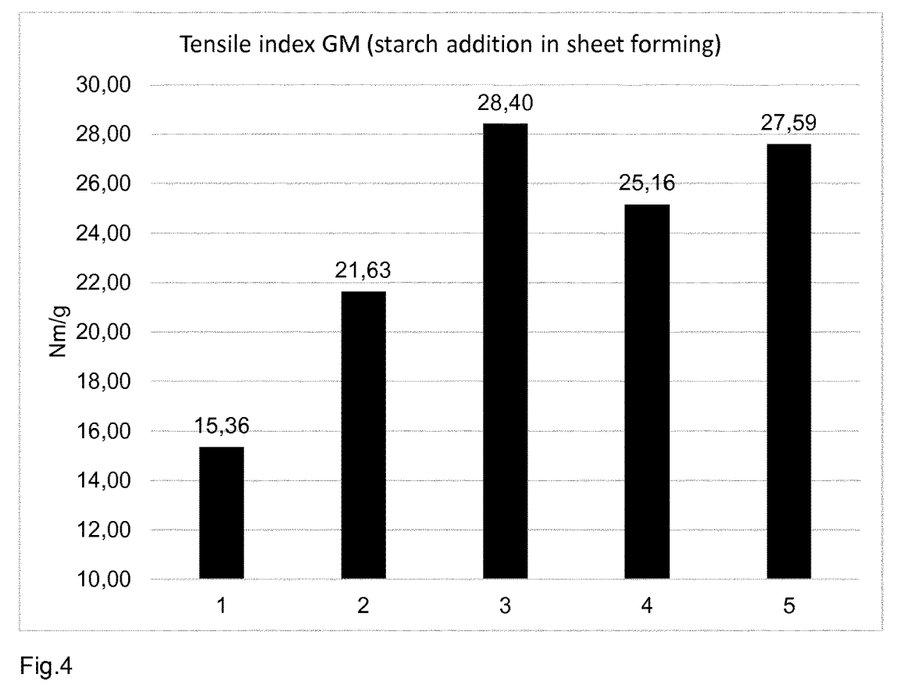
FIG. 4 discloses the tensile index of performed tests according to Example 4.
Figure 5:
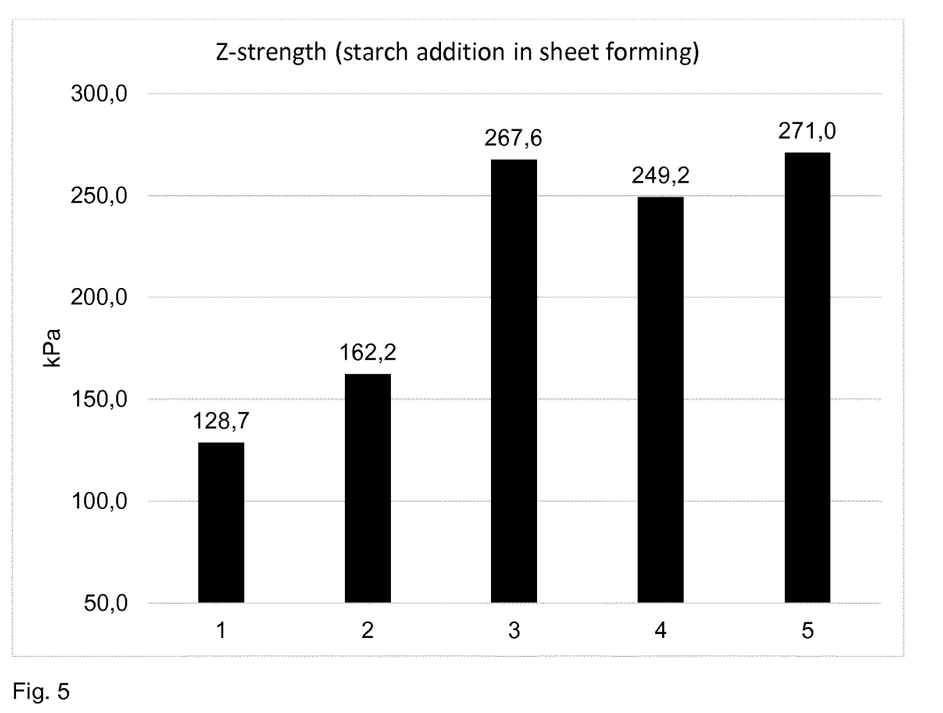
FIG. 5 discloses the Scott bond strength of performed tests according to Example 4.
Figure 6:
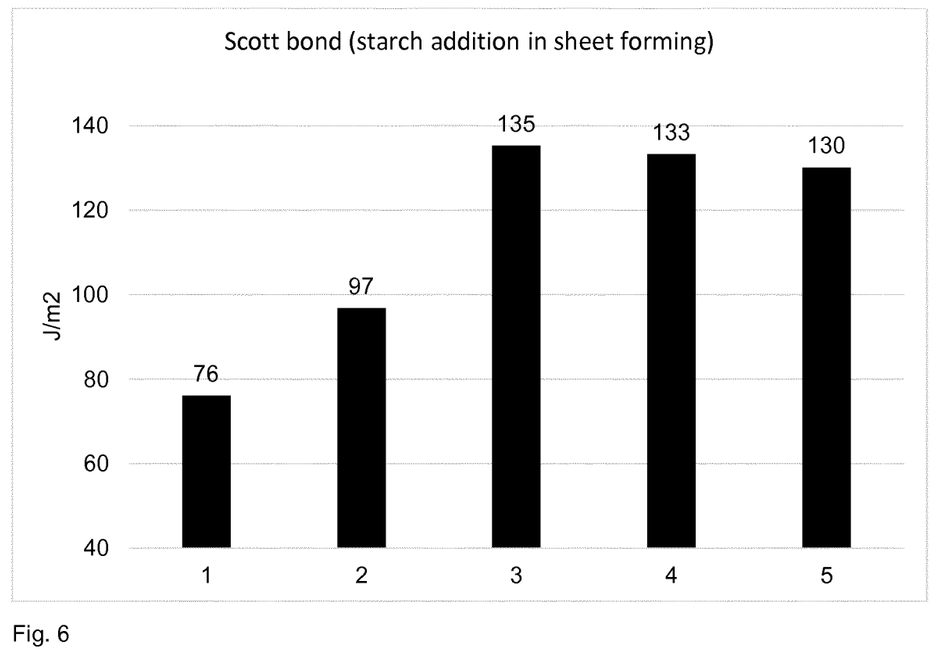
FIG. 6 discloses the Z-directional tensile strength of performed tests according to Example 4.

It can be seen from the results shown in FIGS. 4-6 that when the starch is used in the sheet forming together with MFC1-3 there is no significant difference in the end product strength property enhancement between the samples MFC1 to 3.

Example 5: 61 wt % Cellulose Content Vs. 88 wt % Cellulose Content

A hand sheet study was performed with two MFC samples. The chemical composition of the studied MFC samples are summarized in table 7. MFC-X is having high cellulose content and no pectin while MFC-Y is having lower cellulose content, but higher hemicellulose and pectin content. The used furnish in the hand sheet study was CTMP pulp. The hand sheets were prepared using a dynamic sheet former and the standard protocol.

TABLE 7

Chemical composition of the tested MFC samples

| Analyte | MFC-X wt % | MFC-Y wt % |
|---|---|---|
| Cellulose | 88 | 61 |
| Hemicellulose | 5 | 14 |
| Lignin | 6 | 10 |
| Pectin | 0 | 1 |
| Ash | 3 | 6 |

Scott bond values of the sheets were measured. The results are summarized in table 8. It can be clearly seen that the reference sheet without any MFC has the lowest Scott Bond value. Both MFCs gave good enhancement levels with both dosages (1 w % and 2 w %). However, it can be seen from the results shown in table 8 that MFC-Y with lower cellulose content gave significantly higher Scott Bond values. A lower strength enhancement level is obtained using MFC-X.

TABLE 8

Scott bond values of the hand sheets with no MFC, MFC-X and MFC-Y

| Measurement | Unit | No MFC | MFC-X 1 wt % | MFC-X 2 wt % | MFC-Y 1 wt % | MFC-Y 2 wt % |
|---|---|---|---|---|---|---|
| Scott Bond | J/m² | 46 | 62 | 72 | 66 | 81 |

Example 6: Effect of Other Natural Polymers (Hemicellulose and Pectin) for the Strength Enhancement Two MFC samples were prepared with different chemical composition. MFC-A sample is having higher cellulose content but lower hemicellulose and pectin content while MFC-B is having a lower cellulose content but higher hemicellulose and pectin content. The analytical results are shown in table 9.

TABLE 9

Chemical composition of MFC-A and MFC-B

| Analyte | MFC-A wt % | MFC-B wt % |
|---|---|---|
| Cellulose | 64 | 59 |
| Hemicellulose | 11 | 15 |
| Lignin | 10 | 11 |
| Pectin | 1 | 2 |
| Ash | 7 | 8 |

A hand sheet study was performed with two MFC samples. The used furnish in the hand sheet study was CTMP pulp. The hand sheets were prepared using a dynamic sheet former and the standard protocol.

TABLE 10

Sheet properties of the hand sheets with no MFC, MFC-A and MFC-B

| Measurement | Unit | No MFC | MFC-A 1.5 wt % | MFC-B 1.5 wt % |
|---|---|---|---|---|
| Tensile index GM | Nm/g | 14 | 19 | 21 |
| Z-directional tensile | kPa | 91 | 107 | 136 |
| Scott Bond | J/m2 | 72 | 59 | 85 |

TABLE 11

Measured performance values of MFC-A and MFC-B

| Analysis | MFC-A | MFC-B |
|---|---|---|
| Charge, pH 4 | −0.07 | −0.13 |
| Charge, pH 7.5 | −0.12 | −0.23 |
| Turbidity, 1% | 351 | 270 |
| Viscosity, 1%, 50 rpm | 478 | 902 |
| Viscosity, 1%, 100 rpm | 285 | 503 |

It can be clearly seen that the reference sheet without any MFC has the lowest tensile index and z-strength. Both MFCs gave good enhancement levels in tensile index and Z-strength. However, it can be seen from the results shown in table 9 and 10 that MFC-B with lower cellulose content but higher hemicellulose and pectin contents give significantly higher Scott Bond, tensile index and Z-strength. MFC-B has also higher charge value (see table 11) which reflects to the higher pectin content and is most probably reason behind better performance of MFC-B compared to MFC-A.

Example 7. Viscosity

Two cellulose samples were prepared with the same chemical composition but Cellulose-B was not fibrillated and MFC-B was fibrillated. A hand sheet study was performed with these samples. The used furnish in the hand sheet study was CTMP pulp. The hand sheets were prepared using a dynamic sheet former and the standard protocol. The paper property measurement results are shown in table 12 and the turbidity and viscosity values of Cellulose-B and MFC-B are shown in table 13.

TABLE 12

Sheet properties without MFC, with Cellulose-B and MFC-B

| Measurement | | No MFC | Cellulose-B 1.5 wt % | MFC-B 1.5 wt % |
|---|---|---|---|---|
| Z-directional tensile | kPa | 91 | 101 | 136 |
| Scott Bond | J/m² | 72 | 76 | 85 |

TABLE 13

Viscocity and turbidity values of Cellulose-B and MFC-B

| Measurement | | Cellulose-B | MFC-B |
|---|---|---|---|
| Viscocity, 1 wt %, 100 rpm | cP | 54 | 503 |
| Turbidity, 1 wt % | NTU | 150 | 270 |

The dosages of Cellulose-B and MFC-B are of a dosage level as dry to furnish as dry. It can be clearly seen that the reference sheet without any MFC have the lowest Scott bond and z-strength values. The fibrillated sample MFC-B with higher viscosity level give significantly higher Scott Bond and Z-strength values (table 12) than non-fibrillated Cellulose-B. Viscosity value has meaning and correlation to the strength enhancement (table 13).

Example 8: Activation of the Dried Samples

A standard lab activation of MFC samples is done via two step protocol: 1) a wetting step (magnetic stirring, 1-2 wt % solution, time: 2 hours-overnight, temperature: +23° C.), after which 2) the solution is homogenized with Ultraturrax high-shear mixer (3×10 sec, 1000 rpm). The wetting time for not dried MFC samples is 2 hours.

A set of dried MFC samples were produced with different solid contents. The chemical composition of the MFC-D from which the dried samples were produced is shown in table 14.

TABLE 14

Chemical composition of MFC-D

| Analyte | MFC-D wt % |
|---|---|
| Cellulose | 61 |
| Hemicellulose | 14 |

TABLE 14-continued

Chemical composition of MFC-D

| Analyte | MFC-D wt % |
|---|---|
| Lignin | 10 |
| Pectin | 1 |
| Ash | 6 |

Re-dispersion of the dried samples with different solid contents was studied. The results are summarized in table 15.

TABLE 15

Viscocity measurements of the dried MFC samples after 2 h, 6 h and 16 h wetting step to redisperse the MFC.

| Solid content wt % | 2h wetting 1 wt % viscocity (cp) 100 rpm spindel 75 | 6 h wetting 2 wt % viscocity (cp) 100 rpm spindel 75 | 16 h wetting 1 wt % viscocity (cp) 100 rpm spindel 75 |
|---|---|---|---|
| 74 | 10 | 1102 | 300 |
| 84 | 10 | 1224 | 445 |
| 94 | 10 | not measured | 286 |

It can be clearly seen from the values shown in table 15 that the viscosities of different solid content samples at each time point (2 h, 6 h and 16 h) are in the same magnitude. It can thus be stated that there is no difference of the re-dispersability between the dried samples with different solid contents. Re-dispersability of the MFC compositions disclosed herein is dependent on the wetting time and the mixing efficiency at the wetting stage.

Example 9: Extraction

Sugar beet pulp (i.e. never-dried wet sugar beet clippings) was placed into a beaker followed by a two-step extraction process. The amount of alkali was kept constant (20 g/L) but the temperatures and extraction times were varied. The final water washing step was kept also constant (30 minutes at 80° C.). The extraction conditions are summarized in table 16.

The extracted sugar compositions were analyzed and the analytical results (chemical composition and charge) are summarized in table 16. It can be seen from the results in table 16 that the final composition can be directed by varying the extraction conditions. It can also be seen from the results shown in table 16 that the charge level correlates well to pectin and hemicellulose levels.

TABLE 16

Influence of extraction method

| Test | Extraction 1 | Extraction 2 | Cellulose wt % | Hemicellulose wt % | Pectin wt % | Lignin wt % | Charge pH 7.5 (meq/g) |
|---|---|---|---|---|---|---|---|
| 1 | 10 min, 23° C. | 30 min, 80° C. | 58 | 15 | 7 | 8 | −0.75 |
| 2 | 10 min, 23° C. | 60 min, 80° C. | 64 | 12 | 4 | 8 | −0.44 |
| 3 | 30 min, 80° C. | 30 min, 80° C. | 69 | 10 | 1 | 8 | −0.3 |

What is claimed is:

1. A microfibrillated cellulose composition comprising, a microfibrillated cellulose originating from agricultural biomass, said microfibrillated cellulose comprising the following constituents:
   40-69 wt % cellulose,
   1-15 wt % pectin,
   8-25 wt % hemicellulose,
   0-12 wt %, lignin,
   0-15 wt % ash, and
   0-8 wt % protein,
   wherein the wt % of said constituents is based on dry solids content of said microfibrillated cellulose; and wherein said microfibrillated cellulose composition has a dry solids content of 80-95 wt %, based on the total weight of the microfibrillated cellulose composition.

2. The microfibrillated cellulose composition according to claim 1, wherein the agricultural biomass originates from crop selected from the group consisting of vegetables, fruits, grass, buckwheat; members of the Fabaceae family, and any combination thereof.

3. The microfibrillated cellulose composition according to claim 1, wherein the microfibrillated cellulose composition has at least one of:
   (i) a net charge density of (−0.01)-(−0.99) meq/g, at pH 7.5, using Mütek PCD;
   (ii) a Brookfield viscosity of at least 80 cP, measured at a concentration of 1.0 wt % at 100 rpm shear rate, using a Brookfield DV-II viscometer equipped with a vane geometry ProLV; or
   (iii) a turbidity value less than 500 NTU, measured at 0.1 wt % concentration, using a HACH 2100AN turbidimeter.

4. The microfibrillated cellulose composition according to claim 1, wherein the microfibrillated cellulose composition does not contain added hornification preventing additives.

5. The microfibrillated cellulose composition of claim 1, which comprises the following constituents:
   1-10 wt % pectin,
   8-20 wt % hemicellulose,
   0-10 wt %, lignin,
   0-10 wt % ash, and
   0-6 wt % protein,
   wherein the wt % of said constituents is based on the dry solids content of said composition.

6. The microfibrillated cellulose composition of claim 1, which comprises the following constituents:
   1-8 wt % pectin,
   8-15 wt % hemicellulose, 0-8 wt %, lignin,
0-8 wt % ash, and
0-5 wt % protein,
wherein the wt % of said constituents is based on the total dry solids content of said composition.

7. The microfibrillated cellulose composition according to claim 2, wherein the agricultural biomass originates from a crop selected from the group consisting of
  (i) sugar beet; potato; cassava; sweet potato; parsnip; radish, carrot; ginger; ginseng; onion; tomato; cranberry; blueberry; apple; pear; citrus fruits; and cereals; and combinations thereof; or
  (ii) maize, wheat, oats, rye, barley, sugar cane, and sorghum; buckwheat; peas; beans, sugar beet; potato; cassava; sweet potato; parsnip; radish, carrot; ginger; ginseng; onion; tomato; cranberry; blueberry; apple; pear; orange, lime, lemon, and grapefruit; and cereals; and combinations thereof; or
  (iii) maize, wheat, oats, rye, barley, sugar cane, and sorghum; buckwheat; peas; and beans; and combinations thereof; or
  (iv) dry beans, soy beans, and combinations thereof;
  (v) sugar beet, potato, sugar cane, carrot, cassava, sweet potato, maize and other cereals; and combinations thereof; or
  (vi) any combination of (i) to (v).

8. The microfibrillated cellulose composition according to claim 3, wherein the microfibrillated cellulose composition has a net charge density selected from
  (i) (−0.01)-(−0.99) meq/g, or
  (ii) (−0.01)-(−0.5) meq/g, or
  (iii) (−0.02)-(−0.4) meq/g, or
  (iv) (−0.04)-(−0.3) meq/g, or
  (v) (−0.06)-(−0.2) meq/g,
  at pH 7.5, using Mütek PCD.

9. The microfibrillated cellulose composition according to claim 3, wherein the microfibrillated cellulose composition has a Brookfield viscosity selected from
  (i) at least 100 cP, or
  (ii) 80-1400 cP, or
  (iii) 90-1200 cP, or
  (iv) 100-1000 cP, or
  (v) 100-500 cP,
  measured at a concentration of 1.0 wt % at 100 rpm shear rate using a Brookfield DV-II viscometer equipped with a vane geometry ProLV.

10. The microfibrillated cellulose composition according to claim 3, wherein the microfibrillated cellulose composition has a turbidity value selected from
  (i) less than 400 NTU, or
  (ii) 100-400 NTU, or
  (iii) 200-400 NTU, or
  (iv) 250-350 NTU,
  measured at 0.1 wt % concentration, using a HACH 2100AN turbidimeter.

11. The microfibrillated cellulose composition of claim 1, which comprises
1-15 wt % ash,
wherein said wt % is based on the total dry solids content of said composition.

12. The microfibrillated cellulose composition of claim 1, which comprises
1-10 wt % ash,
wherein said wt % is based on the total dry solids content of said composition.

13. A microfibrillated cellulose composition comprising, a microfibrillated cellulose originating from agricultural biomass, said microfibrillated cellulose composition comprising a microfibrillated cellulose comprising the following constituents:
40-69 wt % cellulose,
1-15 wt % pectin,
10-25 wt % hemicellulose,
0-12 wt %, lignin,
0-15 wt % ash, and
0-8 wt % protein,
wherein the wt % of said constituents is based on dry solids content of said microfibrillated cellulose; and further wherein said microfibrillated cellulose composition has a dry solids content of 80-95 wt %, based on the total weight of the microfibrillated cellulose composition.

* * * * *